United States Patent [19]

Rabassa et al.

[11] Patent Number: 4,980,459

[45] Date of Patent: Dec. 25, 1990

[54] A PROCESS FOR THE MANUFACTURE OF FORMULATIONS OF WATER-INSOLUBLE AZO DYES

[75] Inventors: Alberto Rabassa, Oberwil; Beat Bruttel, Bockten, both of Switzerland

[73] Assignee: Ciba-Geigy Corporation, Ardsley, N.Y.

[21] Appl. No.: 394,238

[22] Filed: Aug. 14, 1989

Related U.S. Application Data

[63] Continuation of Ser. No. 228,850, Aug. 3, 1988, abandoned, which is a continuation of Ser. No. 120,222, Nov. 12, 1987, abandoned, which is a continuation of Ser. No. 649,871, Sep. 12, 1984, abandoned.

[30] Foreign Application Priority Data

Sep. 21, 1983 [CH] Switzerland .................... 5129/83

[51] Int. Cl.$^5$ .................... C09B 29/00; C09B 67/20; C09B 67/44; C09B 67/46; C09B 67/54
[52] U.S. Cl. .................... 534/579; 534/576; 534/887; 514/150; 8/662; 8/688; 8/689; 8/690; 8/692; 106/496
[58] Field of Search .................... 534/576, 579, 587; 514/150; 8/662, 688, 689, 690, 692; 106/496

[56] References Cited

U.S. PATENT DOCUMENTS

| | | | |
|---|---|---|---|
| 2,938,897 | 5/1960 | Armento | 534/576 X |
| 3,793,305 | 2/1974 | Balon | 534/579 |
| 3,920,855 | 11/1975 | Dawson et al. | 534/887 X |
| 3,928,314 | 12/1975 | Rochat et al. | 534/579 |
| 3,941,768 | 3/1976 | Stocker | 534/579 |
| 4,118,384 | 10/1978 | Molls et al. | 534/579 X |
| 4,225,432 | 9/1980 | Booth et al. | 534/887 |
| 4,225,432 | 9/1980 | Booth et al. | 534/887 |
| 4,252,718 | 2/1981 | Atherton et al. | 534/579 |

FOREIGN PATENT DOCUMENTS

| | | | |
|---|---|---|---|
| 3234335 | 3/1984 | Fed. Rep. of Germany | 534/887 |
| 2207169 | 6/1974 | France | 534/887 |
| 2319685 | 7/1976 | France | 534/887 |
| 2341625 | 6/1977 | France | 534/887 |
| 2365609 | 9/1977 | France | 534/887 |
| 1438118 | 6/1976 | United Kingdom | 534/887 |
| 1507595 | 4/1978 | United Kingdom | 534/579 |
| 1552080 | 9/1979 | United Kingdom | 534/579 |

OTHER PUBLICATIONS

Strathmann, Chemie-Technik, vol. 7, pp. 333 to 347 (1978).
Pusch, Angew. Chem., vol. 94, pp. 670 to 695 (1982).
Dr. H. Strathmann, Anwendung von Membranprozessen zur Trennung molekularer Gemische pp. 333-347 1978 Chemie-Technik, 7 Jahrgang.
Dr. W. Pusch Synthetische Membranen—Herstellung, Struktur und Arwendung pp. 670-695 1982 Angew. Chem. 94.

*Primary Examiner*—Floyd D. Higel
*Attorney, Agent, or Firm*—Edward McC. Roberts; George R. Dohmann

[57] ABSTRACT

The invention describes a process for the preparation of formulations of water-insoluble to sparingly soluble azo dyes by simultaneous diazotization and coupling in a single step reaction, filtering the dye dispersion and, if desired, drying the dyestuff, which process comprises carrying out said simultaneous diazotization and coupling by intimately mixing the aqueous solution or suspension of the reactants, in the presence of one or more surface-active agents, concentrating the dilute dye dispersion by membrane separating methods, and at the same time at least partially removing salt and/or acid from the dispersion and converting it into a storage stable liquid formulation or, by drying, into a solid dye formulation.

6 Claims, No Drawings

A PROCESS FOR THE MANUFACTURE OF FORMULATIONS OF WATER-INSOLUBLE AZO DYES

This application is a continuation, of application Ser. No. 228,850, filed 8/3/88, abandoned, which is a continuation of Ser. No. 120,222 filed 11/12/87 abandoned which is a continuation of Ser. No. 649,871 filed 09/12/84 abandoned.

The present invention relates to a process for the preparation of formulations of water-insoluble or sparingly soluble azo dyes, to the formulations obtained by said process, and to the use thereof for dyeing and printing hydrophobic fibre material.

When preparing formulations of water-insoluble or sparingly soluble azo dyes the main aim up to now has been to conduct the synthesis in such a manner that the product obtained at the conclusion of the reaction has as large a particle size as possible and is easily filterable. However, this procedure entails a complicated grinding operation after filtration in order to convert the dye filter cake into a finely particulate dispersion suitable for dyeing. Both the comminution of the dye particles and the conventional filtration method using filter presses are very laborious process steps which necessitate a high consumption of energy.

The development of modern filtration techniques was therefore accompanied by the desire to control the synthesis in such a way that the dye is obtained in finely particulate form so as to avoid all grinding operations as far as possible. Further, in the wake of automation, efforts are being currently made to simplify the synthesis of azo dyes substantially and no longer to carry out diazotisation and coupling in discrete individual steps as hitherto, if possible while additionally clarifying the diazonium salt by filtration, but synchronously in a reaction vessel or a reaction zone.

Such a one-step process for the preparation of azo dyes is known from U.S. patent specification No. 3,793,305, which process involves bringing together, in an acidic medium, a diazotisable aromatic amine, a diazotising agent and a coupling component. The drawback of this process is, however, that it yields a product of markedly large particle size which, although easy to filter, must subsequently be ground.

In addition, DE-OS No. 25 33 603 describes a process for carrying out diazotisation and coupling synchronously, but in which the synthesis suspension is subjected to a grinding operation during the reaction.

Accordingly, it is the object of the present invention to provide a process for the preparation of formulations of water-insoluble or sparingly soluble azo dyes which are obtained in as efficient a manner as possible, namely (a) by diazotising and coupling in one step, (b) without the conventional filtration using a filter press, and (c) without the customary wet grinding.

This object is achieved by carrying out diazotisation and coupling in one step by thoroughly mixing the synthesis suspension in the presence of a surface-active agent, working up the resultant dye dispersion by membrane separation methods and further processing it direct, without grinding, to produce a liquid formulation or a dyestuff formulation of paste-like or solid consistency.

The present invention accordingly relates to a process for the preparation of formulations of water-insoluble to sparingly soluble azo dyes by simultaneous diazotisation and coupling in a single step reaction, filtering the dye dispersion and, if desired, drying the dyestuff, which process comprises carrying out said simultaneous diazotisation and coupling by thoroughly mixing the aqueous solution or suspension of the reactants, in the presence of one or more surface-active agents, concentrating the dilute dye dispersion by a membrane separation method, and at the same time at least partially removing salt and/or acid from the dispersion and thereafter converting it into a storage stable liquid formulation or, by drying, into a solid dye formulation.

The water-insoluble or sparingly soluble azo dyes of this invention are in particular disperse dyes which are suitable for dyeing hydrophobic fibre materials.

Examples of typical diazo components which may be employed in the process of the invention are:

4-nitroaniline, 3-nitroaniline, 2-chloro-4-nitroaniline, 2,6-dichloro-4-nitroaniline, 4-aminoacetanilide, 2,4-dinitroaniline, 2-cyano-4-nitroaniline, 4-cyanoaniline, 4-chloroanilin, 2,4,5-trichloroaniline, 2,5-dimethoxyaniline, o-anisidine, p-anisidine, o-phenetidine, p-phenetidine, o-toluidine, p-toluidine, 4-nitro-2-aminoanisole, 2-nitro-4-aminoanisole, p-phenoxyaniline, α-naphthylamine, 4-methylsulfonylaniline, 4-amino-2,4-dichlorobenzophenone, 4'-amino-2,4-dinitrobenzophenone, 2-aminobenzthiazole, 2-amino-4-chlorobenzthiazole, 2-amino-4-cyanobenzthiazole, 2-amino-4,6-dinitrobenzthiazole, 2-amino-4-methoxy-6-nitrobenzthiazole.

Suitable coupling components are: N-substituted anilines, e.g. N,N-dimethylanilin, N,N-di-(β-carbomethoxyethyl)aniline, N-(γ-methoxypropyl)-3-acetylaminoaniline, N,N-di-(β-hydroxyethyl)-2,5-dimethoxyaniline, N-ethyl-N-(β-cyanoethyl)aniline, N-(cyanoethoxyethyl)-N-(β-cyanoethyl)aniline, N-ethyl-N-(β-hydroxyethyl)aniline, N,N-di-(β-hydroxyethyl)aniline and also phenol and substituted phenols such as o-, m- and p-cresol, resorcinol, 4-phenylazo-1,3-dihydroxybenzene and 3-acetylaminophenol; naphthols such as 1- or 2-naphthol, 6-bromo-2-naphthol, 4-methoxy-1-naphthol and 2-naphthol-6-sulfonamide; or also acylacetoarylamides, 2,6-dihydroxypyridines or 5-pyrazolones.

Diazotisation and coupling are carried out in an acidic reaction medium which is adjusted with a carboxylic acid, e.g. acetic acid, or also with a mineral acid, e.g. sulfuric acid or hydrochloric acid, to a pH value sufficiently low for the reaction.

The procedure suitably is that diazo and coupling component are added together with the surface-active agent, in acid which may be diluted with water, and the diazotising agent, e.g. an aqueous solution of alkali nitrite, is vigorously stirred in. Aside from the addition of one or more surface-active agents, thorough mixing of the reactants is a salient feature of the invention. A fine crystalline product is obtained only by a combination of both measures. Thorough mixing is conveniently achieved by using stirrers with strong shearing effect. The thorough mixing of the components can also be improved by baffling the reaction vessel.

Suitable surface-active agents are cationic, preferably nonionic, and, most preferably, anionic surfactants. Besides surfactants of one or other group it is also possible to use mixtures of surfactants, in particular mixtures of nonionic and anionic surfactants.

Effective anionic surfactants are in particular condensates of aromatic sulfonic acids and formaldehyde, for example condensates of formaldehyde and naphthalenesulfonic acids or of formaldehyde, naphthalenesulfonic acid and benzenesulfonic acid, or a condensate of crude cresol, formaldehyde and naphthalenesulfonic acid. Other suitable anionic surfactants are in particular lignosulfonates, e.g. those obtained by the sulfite or kraft process. They are preferably products which are partially hydrolysed, oxidised, sulfomethylated or desulfonated, and are fractionated by known methods, e.g. according to molecular weight or degree of sulfonation. Mixtures of sulfite- and kraft-lignosulfonates are also very effective. Particularly suitable lignosulfonates are those having an average molecular weight in the range from 1000 to 80,000, a content of active lignosulfonate of at least 80%, and preferably a low content of polyvalent cations. The degree of sulfonation can vary within wide limits. The ratio of carbon to organically bound sulfur is e.g. from 9:1 to 55:1. Preferred anionic surfactants are also dialkyl sulfosuccinates which contain 3 to 10 carbon atoms in each of the alkyl moieties, e.g. dipropylhexyl sulfosuccinate, diisobutyl sulfosuccinate, diheptyl sulfosuccinate, dihexyl sulfosuccinate and diamyl sulfosuccinate, but preferably dioctyl sulfosuccinate.

Other suitable anionic surfactants are sulfated or sulfonated fatty acids, or fatty acid esters of fatty acids of 10 to 22, preferably of 12 to 18, carbon atoms, e.g. sulfated oleic acid, elaidic acid or ricinolic acid or the lower alkyl esters thereof, e.g. the ethyl, propyl or butyl esters thereof. Also very suitable are the corresponding sulfated or sulfonated oils, e.g. olive oil, colza oil and, in particular, castor oil.

The anionic surfactants are normally in the form of their alkali metal salts, ammonium salts, or water-soluble amine salts. It is advantageous to use compounds having a low content of electrolytes.

Suitable nonionic surfactants are preferably ethylene oxide adducts belonging to the class of reaction products of ethylene oxide with (a) saturated and/or unsaturated $C_6$-$C_{20}$ fatty alcohols; or (b) $C_4$-$C_{12}$ alkylphenols; or (c) saturated and/or unsaturated $C_{14}$-$C_{20}$ fatty amines; or (d) saturated and/or unsaturated $C_{14}$-$C_{20}$ fatty acids.

Specific ethylene oxide adducts are:

(a) polyadducts of saturated and/or unsaturated $C_6$-$C_{20}$ fatty alcohols with 5 to 30 moles of ethylene oxide per mole of hyxdroxyl group;

(b) polyadducts of $C_4$-$C_{12}$ alkylphenols with 5 to 20 moles, preferably 8 to 15 moles, of ethylene oxide per mole of phenolic hydroxyl group;

(c) polyadducts of saturated and/or unsaturated $C_{14}$-$C_{20}$ fatty amines with 5 to 20 moles of ethylene oxide per mole of amino group;

(d) polyadducts of saturated and/or unsaturated $C_{14}$-$C_{20}$ fatty acids with 5 to 20 moles of ethylene oxide per mole of carboxyl group.

Among these ethylene oxide adducts, the polyadducts specified in (b) are preferred.

Mixtures of the ethylene oxide adducts of (a), (b), (c) and (d) with one another can also be used. These mixtures are obtained by mixing individual reaction products or direct by ethoxylating a mixture of compounds from which the adducts are derived.

Suitable saturated and/or unsaturated fatty alcohols (a) are dodecanol, palmityl alcohol, stearyl alcohol, oleyl alcohol or tallow fatty alcohol, preferably hexanol, 2-ethylhexanol and decanol.

The alkylphenols in (b) are butylphenol, hexylphenol, and preferably isooctylphenol, p-tert-octylphenol, nonylphenol and dodecylphenol.

In addition to stearylamine and palmitylamine, a suitable fatty amine in (c) is, in particular, oleylamine.

Examples of saturated and/or unsaturated fatty acids in (d) are palmitic acid, in particular stearic acid and oleic acid.

Ethylene oxide/propylene oxide copolymers are e.g. copolymers having a central propylene glycol unit and a molecular weight of 1000 to 20,000.

Examples of suitable cationic surfactants are quaternary alkylammonium halides containing at least one $C_{12}$-$C_{25}$ alkyl radical, and long chain alkylpyridinium halides.

The surfactant or surfactant mixture is used in an amount of 0.2 to 30% by weight, preferably 0.5 to 15% by weight, based on the theoretical amount of dye expected.

The membrane separating processes which are employed in the practice of this invention are in particular the following membrane filtration processes:

microfiltration using pore membranes having a pore diameter of 0.5 to 20 μm ultrafiltration using finely porous membranes having a pore diameter of 10 Å to 1 μm hyperfiltration through ion exchanger or solvent diffusion membranes having a pore diameter of <20 Å.

Concerning the theory and use of membrane separating processes, reference is made e.g. to H. Strathmann, Chemie-Technik 7, 333 (1978), or to W. Pusch, A. Walch, Angew. Chem. 94, 670 (1982).

Of the above filtration processes it is preferred to employ ultrafiltration in the practice of this invention. Suitable membranes are those made of organic and those made of inorganic material. Examples of organic membrane materials are polyvinylidene fluoride, cellulose acetate, polytetrafluoroethylene, copolymers of polyacrylonitrile and vinyl pyrrolidone, polysulfone, polyamide or also hydrophilised polyolefins. Examples of inorganic membranes are those of porous carbon, the surface of which is coated with a thin layer of zirconium oxide or aluminium oxide, or of porous glass. Both organic and inorganic membranes are conveniently used in tube form, with several tubes being comprised in a tube membrane module.

Because of their good resistance to acids and lyes, inorganic membranes afford the possibility of concentrating the hot, strongly acid synthesis dispersion without prior neutralisation direct and to wash it free of acid.

After the membrane separating process, the concentrated, neutral, substantially salt-free dyestuff dispersion is freed, if necessary, from an insignificant amount of coarse particles by intermediate sieving, and further processed to a storage stable liquid formulation or to a solid formulation.

To prepare a commercial liquid formulation it is only necessary to adjust the dyestuff dispersion, optionally after the addition of the assistants conventionally employed for liquid formulations, e.g. textile auxiliaries, foam inhibitors, antifreeze agents, humectants, dispersants and/or microbicides, to a predetermined final dye concentration by dilution and/or with the aid of extenders. The dyestuff dispersion can also be converted into a solid dye formulation by drying, optionally after the addition of assistants such as binders, dust inhibitors, dispersants and/or extenders. Owing to the increased dye concentration, less energy is required for drying. Conventional drying methods are employed, in particular spray drying.

The dye formulations are used for preparing dyebaths, padding liquors or printing pastes, which are particularly suitable for dyeing hydrophobic fibre material, especially polyester.

The invention is illustrated by the following Examples in which parts and percentages are by weight.

EXAMPLE 1

A reaction vessel is charged at 3° to 5° C. with 67 parts of glacial acetic acid, 25.6 parts of 4-nitroaniline, 70.5 parts of N-(cyanoethoxyethyl)-N-(β-cyanoethyl)aniline (53.9% solution), 2 parts of a nonionic adduct of 1 mole of p-tert-octylphenol and about 8 moles of ethylene oxide, and 2.5 parts of a condensate of naphthalenesulfonic acid and formaldehyde. With efficient stirring, 38 parts of 4 N sodium nitrite solution are added dropwise over one hour, while keeping the temperature at 3° to 5° C. When the reaction is complete, stirring is continued for 5 hours and the dyestuff dispersion is freed from acetic acid by ultrafiltration, washed until neutral and concentrated. A tube membrane module with a surface area of 0.16 m$^2$ is used for the ultrafiltration. The membrane matrix consists of graphite, and the inside is coated with a layer of porous zirconium oxide. The molecular cut-off level is at a molecular weight of about 40,000. The ultrafiltration is carried out at a rate of flow of 4 to 5 m/sec and under a pressure of 3 to 5 bar. At the start of ultrafiltration the solids content of the dispersion is from 8 to 15% and, at the conclusion, is 30 to 35%.

After ultrafiltration, the orange dispersion is further processed to a liquid formulation either by adding a dispersant and ethylene glycol, or is spray dried after addition of a dispersant and an extender. Both the liquid and the solid, finely particulate formulation can be used direct for dyeing polyester, acetate and triacetate fibre material.

The composition of the liquid formulation is as follows:
16.7% of dye
16.2% of dispersant (oxylignosulfonate)
10.0% of ethylene glycol
0.5% of chloroacetamide
56.6% of water.

The composition of the solid formulation is as follows:
33.3% of dye
51.0% of oxylignosulfonate
14.7% of naphthalenesulfonic acid/formaldehyde condensate
1.0% of sodium 2-heptadecylbenzimidazole disulfonate.

EXAMPLE 2

The procedure described in Example 1 is repeated, using 2.5 parts of sodium dioctylsulfosuccinate instead of 2 parts of the ethylene oxide adduct.

EXAMPLE 3

The procedure described in Example 1 is repeated, using only a nonionic surfactant as surface-active agent, viz. 2.5 parts of the octylphenol ethoxylate employed therein.

EXAMPLE 4

A reaction vessel is charged at 0° C. to 3° C. with 520 parts of glacial acetic acid, 24.2 parts of 2-chloro-4-nitroaniline (71.4%), 17.6 parts of N,N-bis(2-cyanoethyl)aniline (79.4%) and 7.5 parts of N,N-bis(2-cyanoethyl)-1,3-toluidine (85.7%) together with 5 parts of sulfomethylated hydroxylignosulfonate (anionic surfactant), prepared by the kraft process from alkaline wood pulp. With efficient stirring, 25 parts of 4 N sodium nitrite solution are added dropwise over 30 minutes, while keeping the temperature at 0°-3° C. When the reaction is complete, the reaction mixture is stirred for a further 2 hours and the dyestuff dispersion is then freed from acetic acid by ultrafiltration, washed until neutral and concentrated. The same module as indicated in Example 1 is used for the ultrafiltration.

After ultrafiltration, the orange, finely particulate dispersion (average particle size: 2 μm) is further processed to a liquid formulation after addition of dispersants and conventional assistants, or is spray dried direct.

Both the liquid and the finely particulate, solid formulation can be used direct for dyeing polyester, acetate and triacetate fibre material.

The composition of the liquid formulation is as follows:
25% of dye
12% of oxylignosulfonate dispersant
6.6% of naphthalenesulfonate dispersant
8.8% of sorbitol (humectant)
0.5% of chloroacetamide (fungicide)
47.1% of water.

The composition of the solid formulation is as follows:
50% of dye
35% of oxylignosulfonate dispersant
10% of naphthalenesulfonate dispersant
5% of residual moisture.

What is claimed is:
1. A process for the manufacture of formulations of water-insoluble to sparingly water-soluble azo dyes which comprises the steps of:
   (a) simultaneously carrying out diazotization and coupling by thoroughly mixing without wet grinding an aqueous solution or suspension of a diazotizable aromatic amine, a diazotizing agent and a coupling component, acidified by carboxylic or mineral acid, in the presence of at least one surface active agent selected from the group consisting of anionic or nonionic surfactants or mixtures of both, to obtain a finely dispersed dye dispersion;
   (b) simultaneously concentrating the dilute dye dispersion of step (a) and removing at least part of any salt and acid from said dispersion by a membrane separation method without neutralization of the dye dispersion prior to said membrane separation method, and
   (c) converting the concentrated and at least partially desalted dyestuff dispersion obtained by step (b), without wet grinding, into a storage stable liquid dye formulation, by dilution and adding at least one assistant selected from the group consisting of extenders, antifreeze agents, humectants, dispersants and microbicides, or
   (d) converting the concentrated and at least partially desalted dyestuff dispersion obtained in step (b), without wet grinding, by spray drying into a gran- ular dye formulation by adding before or after drying at least one assistant selected from the group consisting of binders, dust inhibitors, dispersants and extenders.

2. A process according to claim 1, wherein the anionic surfactant is a condensate of naphthalenesulfonic acid and formaldehyde, a lignosulfonate or a dialkyl sulfosuccinate, and the nonionic surfactant is an alkylphenol, fatty alcohol, fatty acid or fatty amine ethoxylate.

3. A process according to claim 1, which comprises using the surface-active agent or agents in an amount of 0.5 to 15% by weight, based on the theoretically expected amount of dye.

4. A process according to claim 1, wherein the membrane separating process employed consists of microfiltration, ultrafiltration or hyperfiltration.

5. A process according to claim 1, wherein the membrane separating process employed consists of ultrafiltration.

6. A process according to claim 1, wherein the surface-active agent is a mixture of anionic and nonionic surfactants.

* * * * *